(12) United States Patent
Schaeck

(10) Patent No.: US 7,890,601 B2
(45) Date of Patent: *Feb. 15, 2011

(54) SYSTEM FOR DYNAMICALLY INTEGRATING REMOTE PORTLETS INTO PORTALS

(75) Inventor: Thomas Schaeck, Achern (DE)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/177,485

(22) Filed: Jul. 22, 2008

(65) Prior Publication Data

US 2009/0006578 A1    Jan. 1, 2009

Related U.S. Application Data

(63) Continuation of application No. 10/095,421, filed on Mar. 12, 2002, now Pat. No. 7,502,833.

(30) Foreign Application Priority Data

May 11, 2001    (EP) .................................. 01111541

(51) Int. Cl.
    *G06F 15/16*    (2006.01)
(52) U.S. Cl. ....................... 709/217; 715/749; 715/760; 715/762
(58) Field of Classification Search ................. 709/217; 715/749, 760, 762
    See application file for complete search history.

(56) References Cited

U.S. PATENT DOCUMENTS

| | | |
|---|---|---|
| 6,199,753 B1 | 3/2001 | Tracy et al. |
| 6,233,608 B1 | 5/2001 | Laursen et al. |
| 6,289,362 B1 | 9/2001 | Van Der Meer |
| 6,516,349 B1 | 2/2003 | Lieberman |
| 6,519,568 B1 | 2/2003 | Harvey et al. |
| 6,519,571 B1 | 2/2003 | Guheen et al. |
| 6,609,113 B1 | 8/2003 | O'Leary et al. |
| 6,636,894 B1 | 10/2003 | Short et al. |

(Continued)

OTHER PUBLICATIONS

Informatiom Materials for an IDS, Date of Japanese Office Action Jun. 20, 2006.

(Continued)

*Primary Examiner*—Tonia L Dollinger
*Assistant Examiner*—Asghar Bilgrami
(74) *Attorney, Agent, or Firm*—Jeffrey T. Holman

(57) ABSTRACT

The present invention discloses a system and method allowing dynamically integrating remote portlets into each Portal by providing local portlets as remote portlet Web-Services by providing, to each Portal-Server, a publishing functionality allowing electronic creation of a service description for each single local portlet and publishing it into a Central-Registry and a find/binding functionality to find remote portlet Web-Services via the Central-Registry and bind them using the service description for accessing the remote portlet. Preferably, each Portal-Server includes a Portlet-Registry component as well as a Portlet-Proxy. The Portlet-Registry provides service description to the Portlet-Proxy that establishes a SOAP-communication with a remote Portal-Server providing the remote portlet Web-Service to be selected. The main advantage of the present invention is that local portlets become available for all Portal-Server without requiring local installation of the portlet code itself. Furthermore, new remote portlets can be included into a portal by finding them in a registry and binding them.

9 Claims, 17 Drawing Sheets

U.S. PATENT DOCUMENTS

| | | | |
|---|---|---|---|
| 6,668,353 B1 * | 12/2003 | Yurkovic | 715/205 |
| 6,853,978 B2 | 2/2005 | Forth et al. | |
| 6,868,525 B1 | 3/2005 | Szabo | |
| 6,965,868 B1 | 11/2005 | Bednarek | |
| 2002/0095399 A1 | 7/2002 | Devine et al. | |
| 2002/0147652 A1 | 10/2002 | Gheith et al. | |
| 2004/0156491 A1 * | 8/2004 | Reding et al. | 379/201.02 |
| 2005/0038851 A1 | 2/2005 | Kriegsman | |
| 2006/0047781 A1 | 3/2006 | Anuff et al. | |

OTHER PUBLICATIONS

Nishiwaki, "Frontline of Enterprise Portals—Evaluation of Strategies and Product Solutions of Four DB Vendors—Easy Systems Delivery with Oracle Portal Oracle 9i Application Server of Oracle Japan and Integrated Portlets", DB Magazine No. 10-16, pp. 58-63, Publisher: Shoeisya, Apr. 1, 2001.

Watanabe, "Technology Enterprise Management and People for the 21st Century Information/Network Systems, The Age of NET has come?—Checking Distribution Processing Environment with Web Services and its Issues, Vendors and User Opinions—Expectations and Concerns to NET", Nikkei Windows 2000 Magazine, No. 46, pp. 124-133, Publisher: Nikkei BP, Jan. 1, 2001.

* cited by examiner

SYSTEM FOR DYNAMICALLY INTEGRATING REMOTE PORTLETS INTO PORTALS

CROSS REFERENCE TO RELATED APPLICATIONS

The current application is a continuation application of U.S. patent application Ser. No. 10/095,421, filed on Mar. 12, 2002, now U.S. Pat. No. 7,502,833 which is hereby incorporated by reference.

BACKGROUND OF THE INVENTION

The present invention relates to Portal-Server using portlets and in particular how remote portlets may be installed, accessed and used by a Portal-Server.

Portals are becoming the focal points for users to access information and applications from many different sources. Typically, Portals get information from local or remote data sources, e.g. from databases, transaction systems, syndicated Content-Providers, or remote web sites, and render and aggregate this information into complex pages to provide information to users in a condensed form. In addition to pure information, many Portals also include applications like e-mail, calendar, organizers, banking, bill presentment, etc. A well-known example is the Yahoo! Portal that provides access to a large amount of content and applications.

Figure 1:
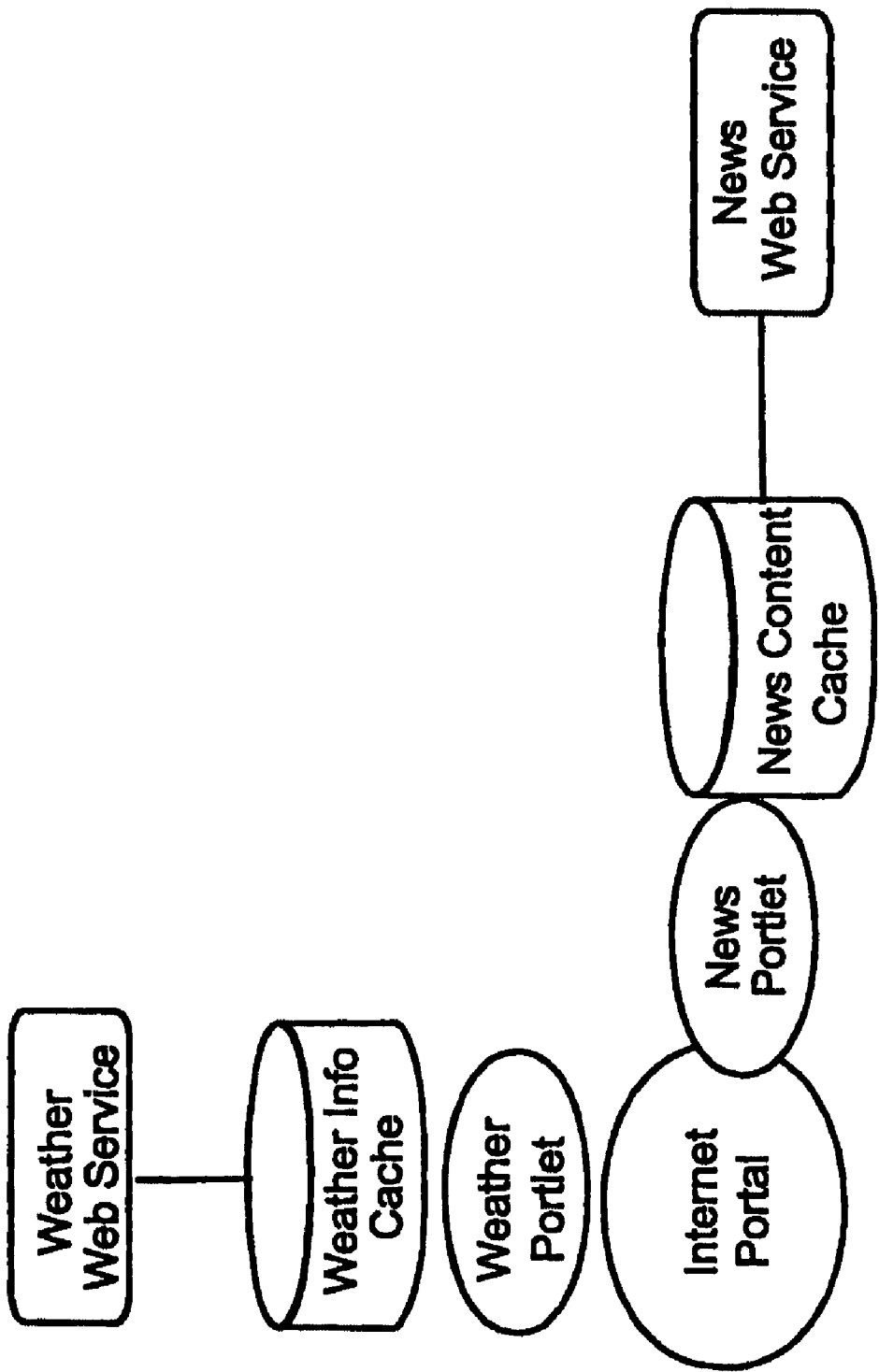

Different rendering and selection mechanisms are required for different kinds of information or applications, but all of them rely on the portal's infrastructure and operate on data or resources that are owned by the portal, e.g. user profile information, persistent storage or access to managed content. Consequently, most of today's Portal implementations provide a component model, where pluggable portal component modules referred to as Portlets can be added to the portal infrastructure. Portlets are pluggable components that can be added to Portals and are designed to run inside a portal's portlet container. Portlets may provide different functions ranging from simple rendering of static or dynamic content to application functions such as e-mail, calendar, etc. Portlets are invoked indirectly via the portal application and produce content that is suited for aggregation in larger pages, e.g. portlets should produce mark-up fragments adhering to guidelines that assure that the content generated by different portlets can be aggregated into one page. Typically, portlets run on the Portal-Server, processing input data and rendering content locally. The content for portlets which are displayed very often is cached locally to improve response times, performance and scalability of portals. FIG. 1 shows a weather portlet and a news portlet running on an Internet-Portal. The Portal uses databases to cache weather info and news content locally so that the portlets can display them without delay.

While local portlets typically provide short response times, this approach is not well suited to enable dynamic integration of business applications and information sources into Portals. More and more local portlets running in a Portal environment using Web-Services provided by a Web-Service-Provider. Web-Services may be defined as providing existing or software components into a service-oriented architecture (SOA). Example of such services may be explained by FIG. 2 which covers the following scenario: An employee Portal manager wants to include a human resources service (HR Web-Services) that can calculate the variable pay for employees and an external weather Web-Service that provides weather forecasts for given cities. Human resources portlet (HR Portlet) and a weather portlet run locally on the portal server.

The HR portlet uses a HR Web-Service to calculate the variable pay. A possible implementation is a portlet that by default displays a form to query the required parameters, e.g. the position and last grade of an employee. When the employee enters his data at the HR portlet, it invokes the remote Web-Service to calculate the variable pay based on that data. It receives the result from the Web-Service and displays it as a page fragment. The weather portlet by default displays weather forecasts for configurable locations. It allows the user to select locations through an edit mode. Whenever the Portal displays it, the weather portlet gets the most recent forecasts for the selected locations and renders a page fragment that displays them. To support that HR Web-Service in the Internet, a new architecture was defined, SOA, the Service Oriented Architecture. This new architecture describes how a Web-Service may be found by a user, how a potential user can access such Web-Services, and a language describing the Web-Service.

The communication protocol for these Web-Services is also a new defined protocol, called SOAP which stands for Simple Object Access Protocol.

SOAP is a way for a program running in one kind of operating system to communicate with a program in the same or another kind of an operating system by using preferably the World Wide Web's Hypertext Transfer Protocol (HTTP) and its Extensible Markup Language (XML) as the mechanisms for information exchange. Since Web protocols are installed and available for use by all major operating system platforms, HTTP and XML provide an already at-hand solution to the problem of how programs running under different operating systems in a network can communicate with each other. SOAP specifies exactly how to encode an HTTP-header and an XML-file so that a program in one computer can call a program in another computer and pass it information. It also specifies how the called program can return a response.

Figure 3:
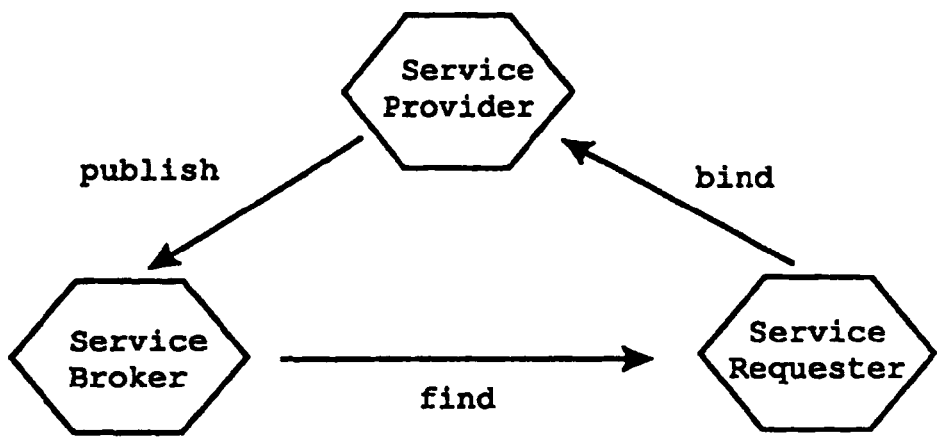

The basic architecture of SOAP is shown in FIG. 3. The basic architecture comprises three components, the Service-Providers, the Service-Brokers, and the Service requesters.

The Service-Providers publish the availability of their Web-Services, the Service-Brokers register and categorize the published Web-Services and provide search services, and the Service-Requesters using Service-Broker to find a needed Web-Service and then employing that Web-Service.

Figure 2:
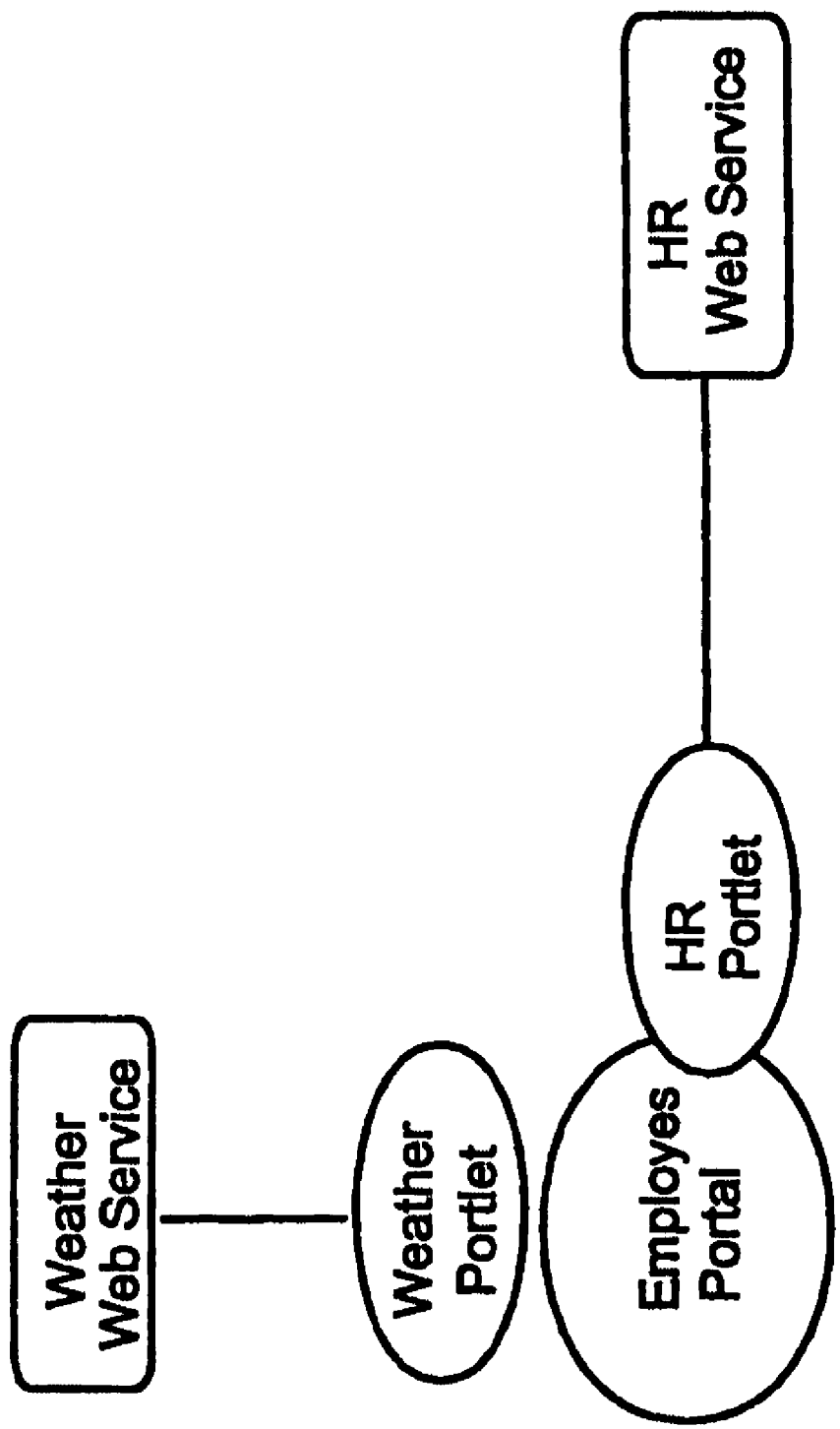
Figure 4:
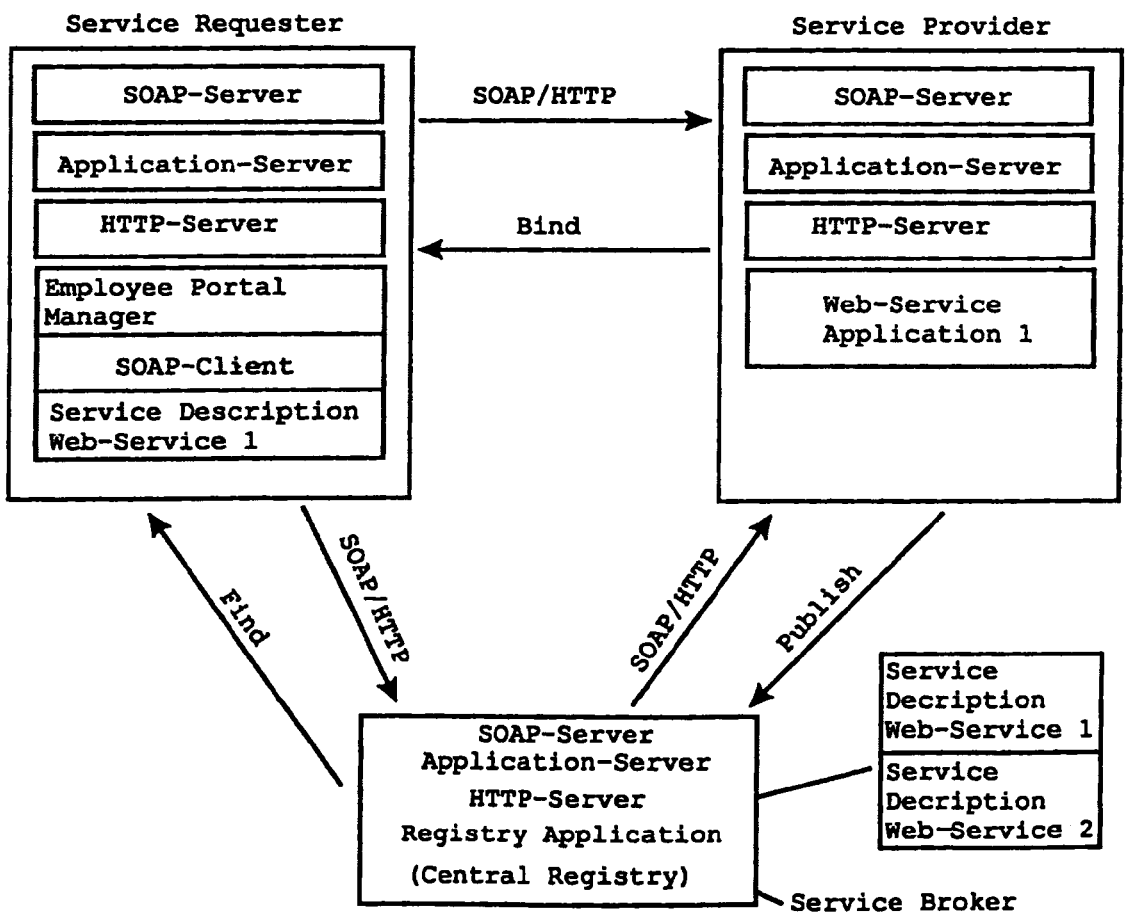

A typical SOAP-communication architecture based on the embodiment of FIG. 2 is shown in FIG. 4.

Service-Provider offers a HR Web-Service to calculate the variable pay. Service-Providers publish their Web-Service to Service-Broker (Central-Registry). The Service-Provider knows the semantics of the Web-Service and publishes it in the right category in the Service-Broker's taxonomy. What is published by the Service-Provider to the Service-Broker is called service description. Service descriptions are XML-documents that describe the semantics and the message API (Application Programming Interface) of a certain Web-Service. For example, the service description for an HR Web-Service to calculate the variable pay may include the price of the service, availability, functionality, URL, IDL and so on. IDL, or Interface-Definition-Language, defines the input and output data required by that Web-Service. Service requesters, knowing the Web-Service they need, ask the Service-Broker for a list of services in that category. A Service-Requester receives, by a SOAP-Find response, a service description for the requested Web-Service. The Service Requester uses the IDL for converting the input data format generated by the employee portal manager into a data format required by Web-Service and sends a SOAP-request containing the converted input data to the HR Web-Service. The Web-Service returns a SOAP response containing the result (output data), e.g. the variable pay, to the Service Requester.

Providing portlets to the Portal is tedious. For the above-mentioned HR portlet, either the HR department needs to implement the HR Portlet and give it to one of the administrators of the employee Portal so that he can install it there, or a developer from the employee portal team has to implement the HR portlet to the interface description of the HR Web-Service. For the weather portlet, the Employee Portal team needs to implement a special weather portlet that provides the functionality described above. There is significant effort for the employee portal team to make the two portlets available.

It is therefore an object of the present invention to provide a system and method to provide portlets for Portals by minimizing code at the Portal side.

It is further object of the present invention to provide a simplified procedure for installing, accessing and using remote portlets by Portals.

Finally it is object of the present invention to share portlets between multiple Portals without requiring additional communication components at the Portal side.

These objects have been addressed by the features of the independent claims. Preferred embodiments of the present invention are laid down in the dependent claims.

BRIEF SUMMARY OF THE PRESENT INVENTION

The present invention discloses a system and method for allowing dynamically integrating remote portlets into each Portal by providing local portlets as remote portlet Web-Services by providing to each Portal-Server a publishing functionality allowing electronic creation of a service description for each single local portlet and publishing it into a Central-Registry and a find/binding functionality allowing the finding of remote portlet Web-Services via the Central-Registry and binding them using the service description for accessing the remote portlet. Preferably, each Portal-Server includes a Portlet-Registry component as well as a Portlet-Proxy. The Portlet-Registry provides a service description to the Portlet Proxy, which establishes a SOAP-communication with a remote Portal-Server providing the remote portlet Web-Service to be selected. The main advantage of the present invention is that local portlets become available for all Portal-Servers without requiring local installation of the portlet code itself. Furthermore, new remote portlets can be included into a portal by finding them in a registry and binding them.

The present invention will be described in more detail with the accompanying drawings in which FIG. 1 shows a prior art Portal using local portlets FIG. 2 shows prior art local portlet using a Web-Service FIG. 3 shows the basic structure of a SOAP-Web Service architecture on which the present invention is based FIG. 4 shows a typical SOAP-Web-Service communication structure as used by embodiment of FIG. 2

Figure 5:
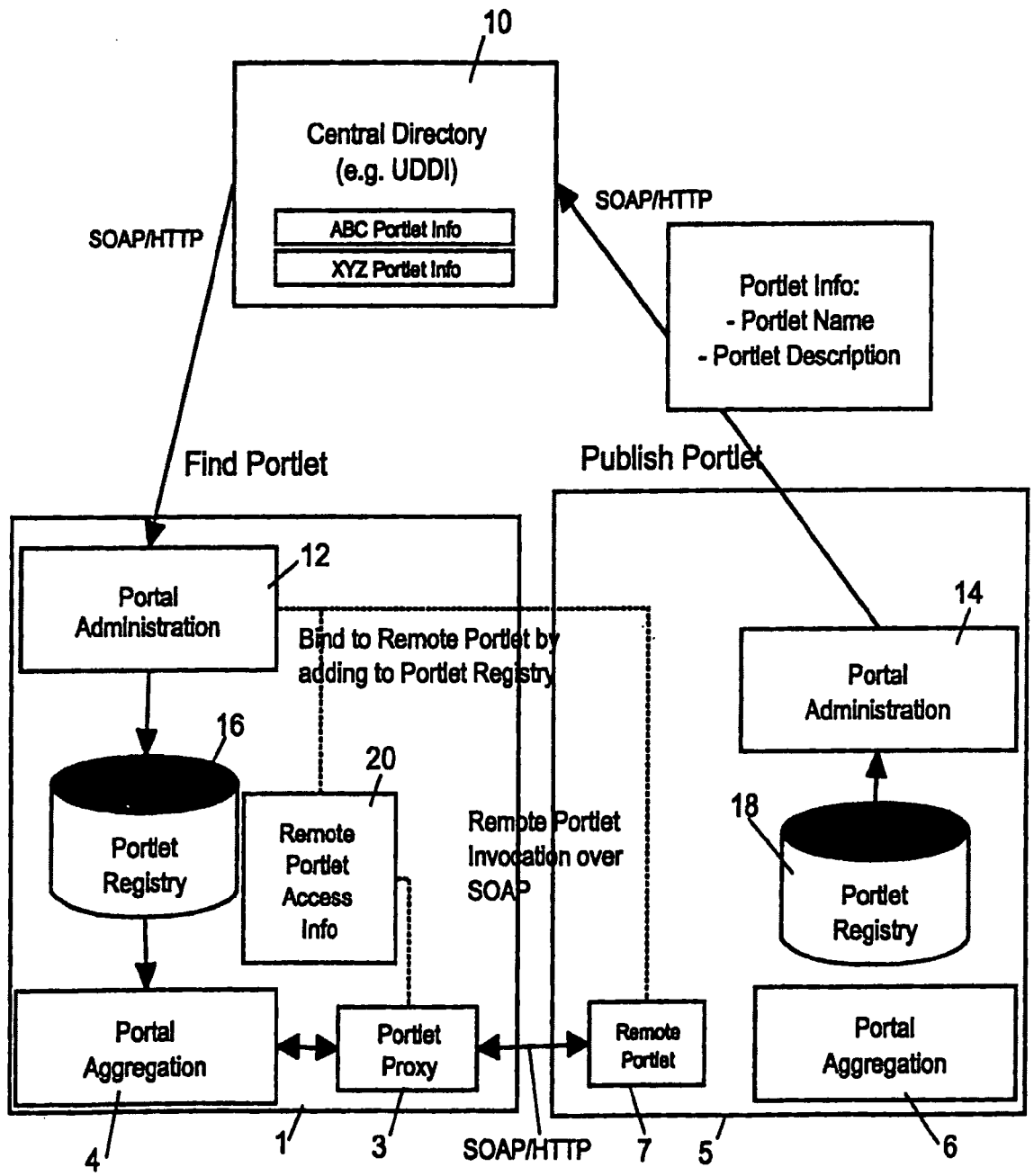
Figure 6:
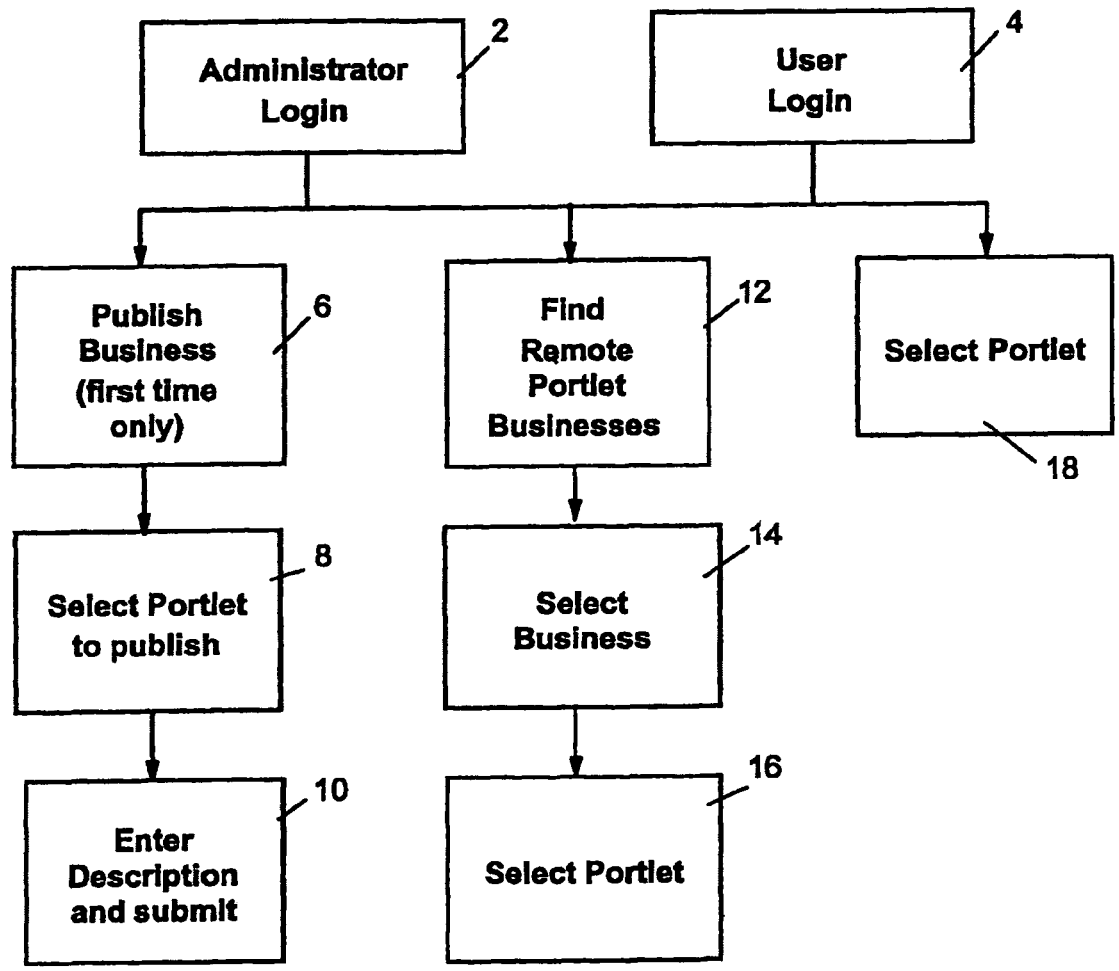
Figure 7A:
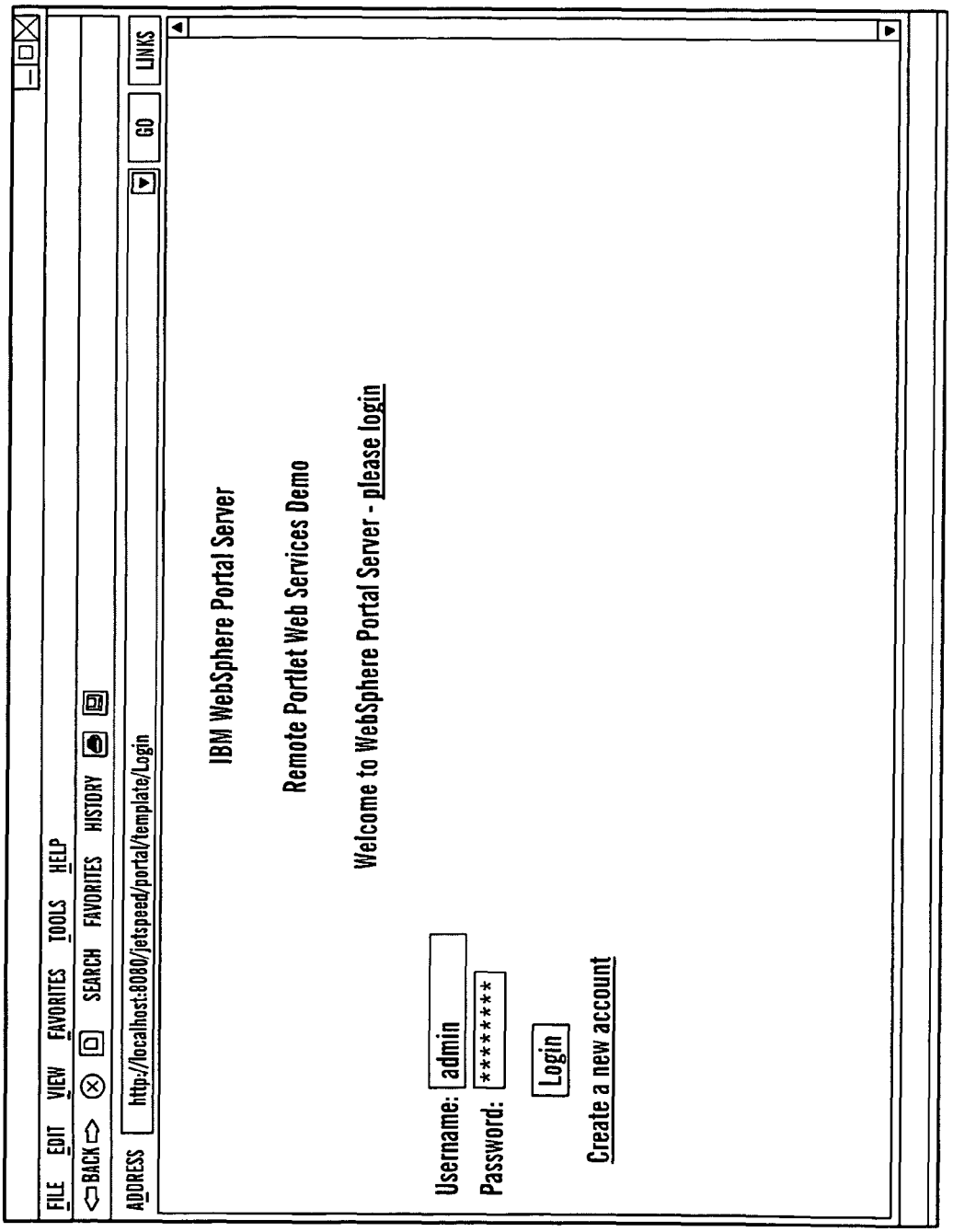
Figure 7B:
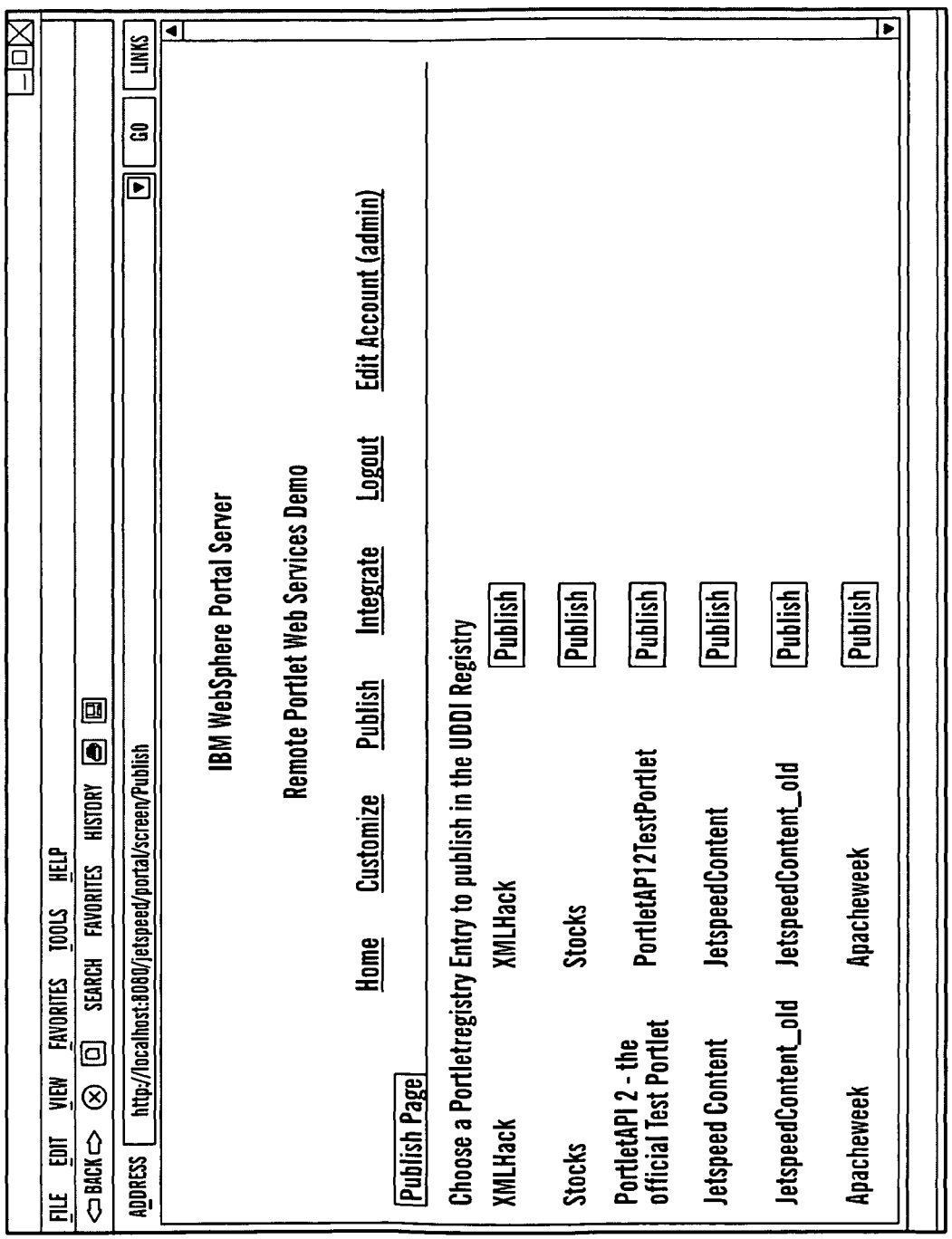
Figure 7C:
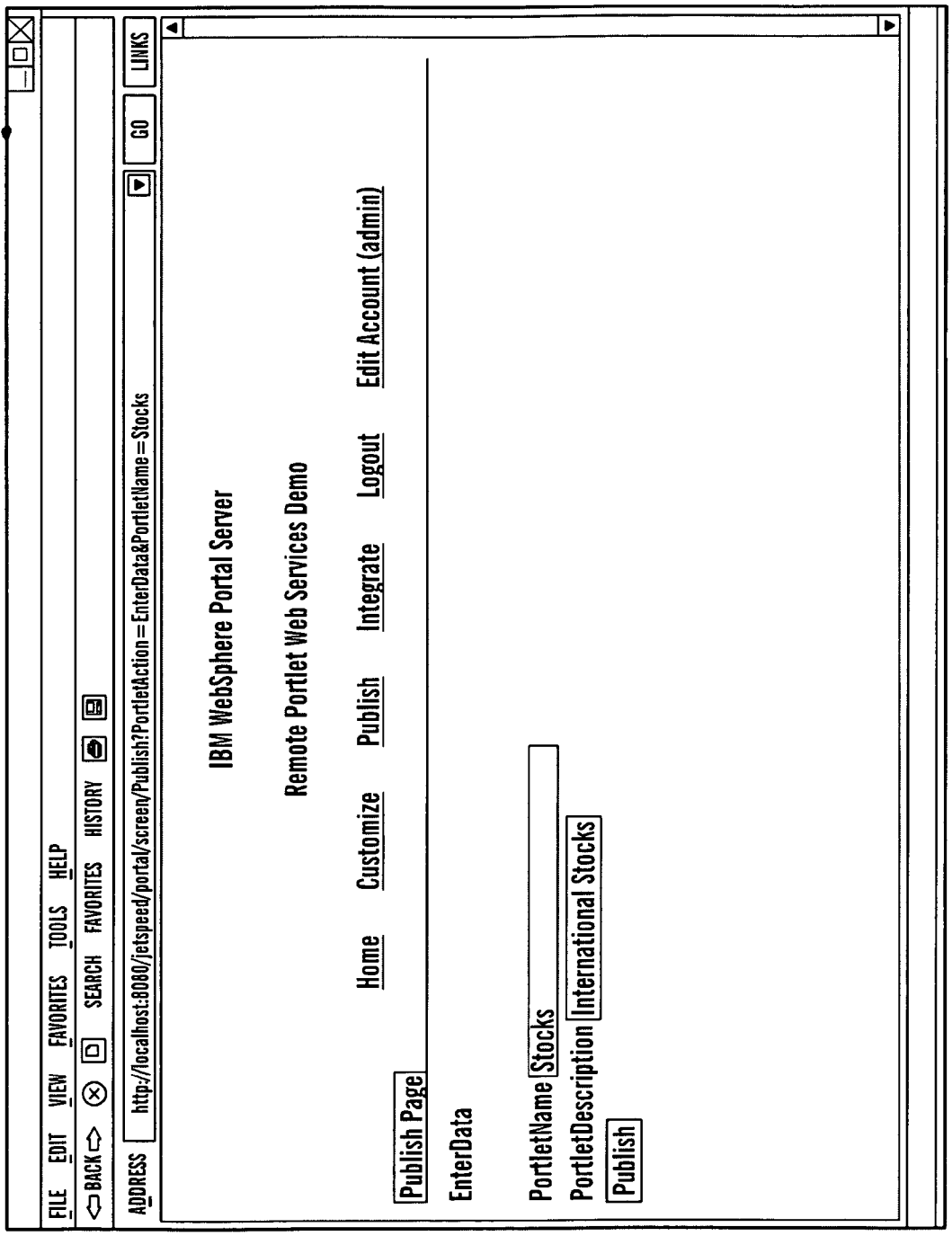
Figure 7D:
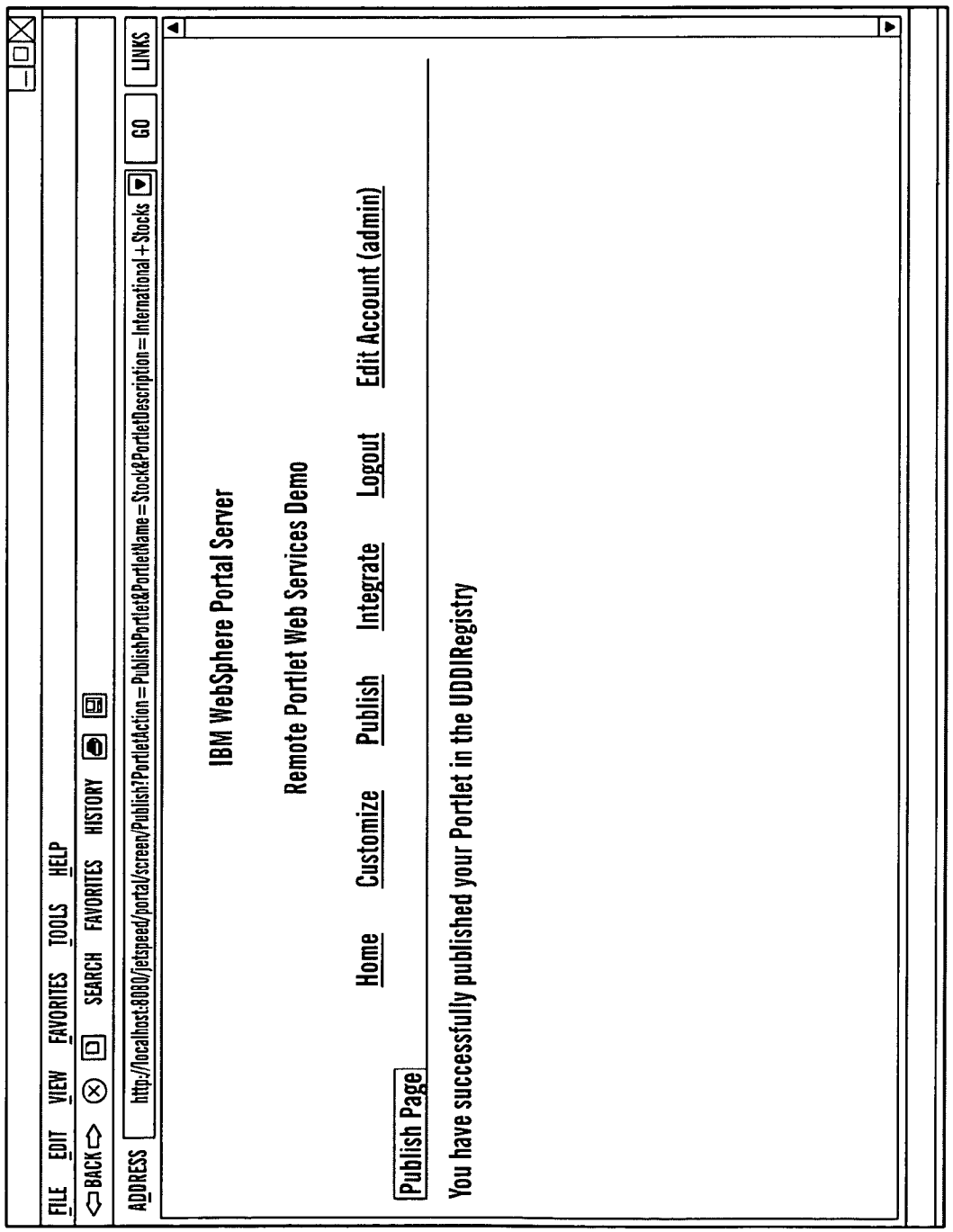
Figure 7E:
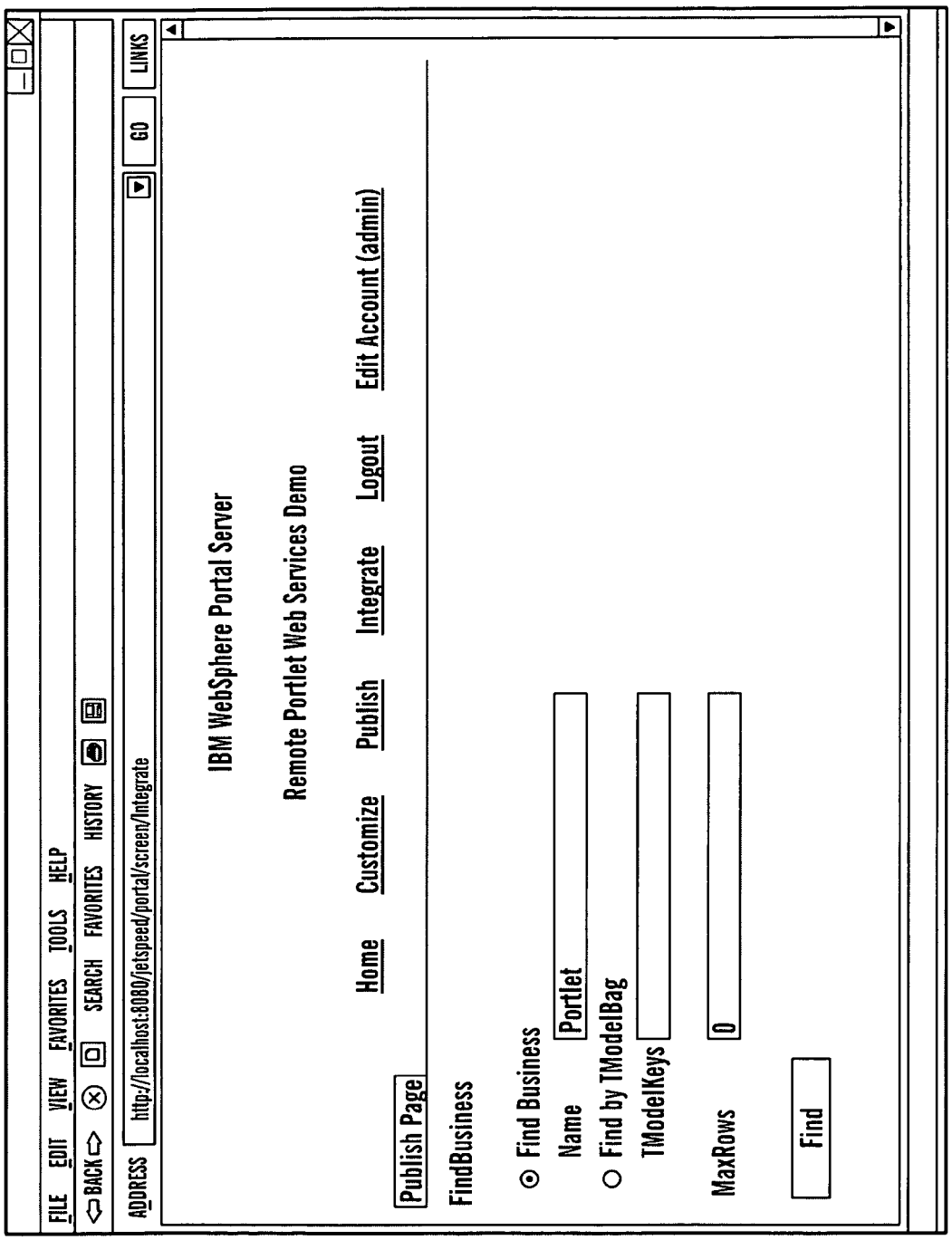
Figure 7F:
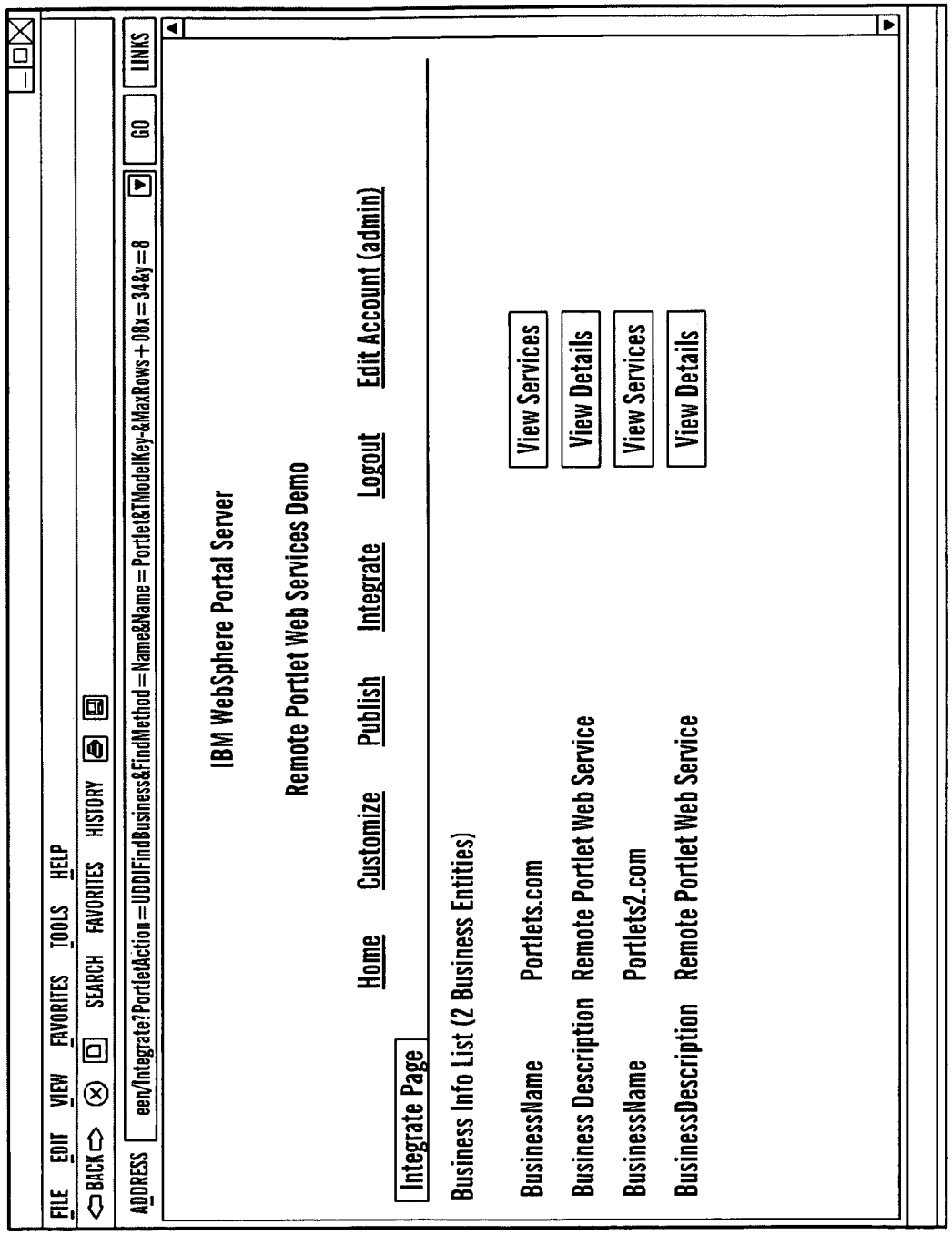
Figure 7G:
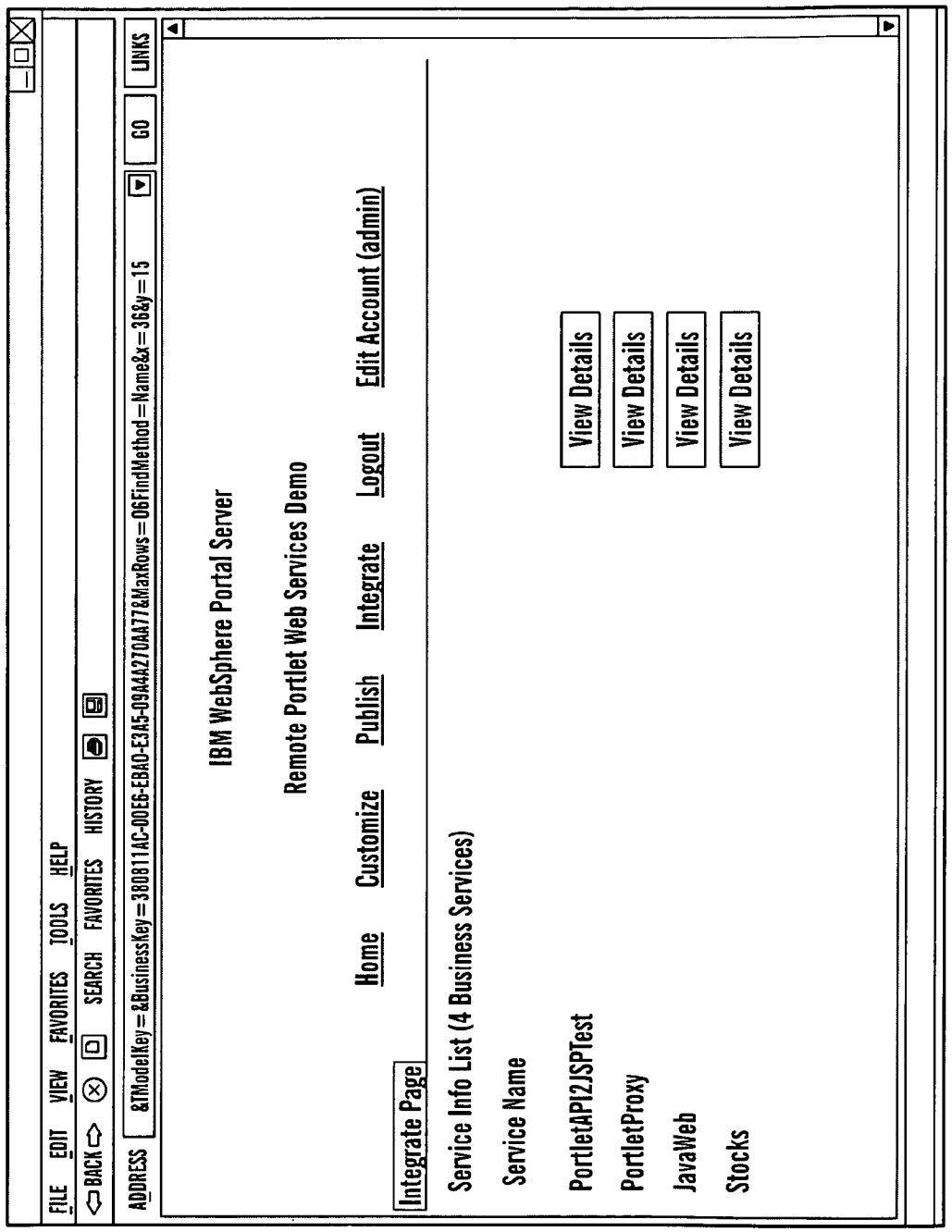
Figure 7H:
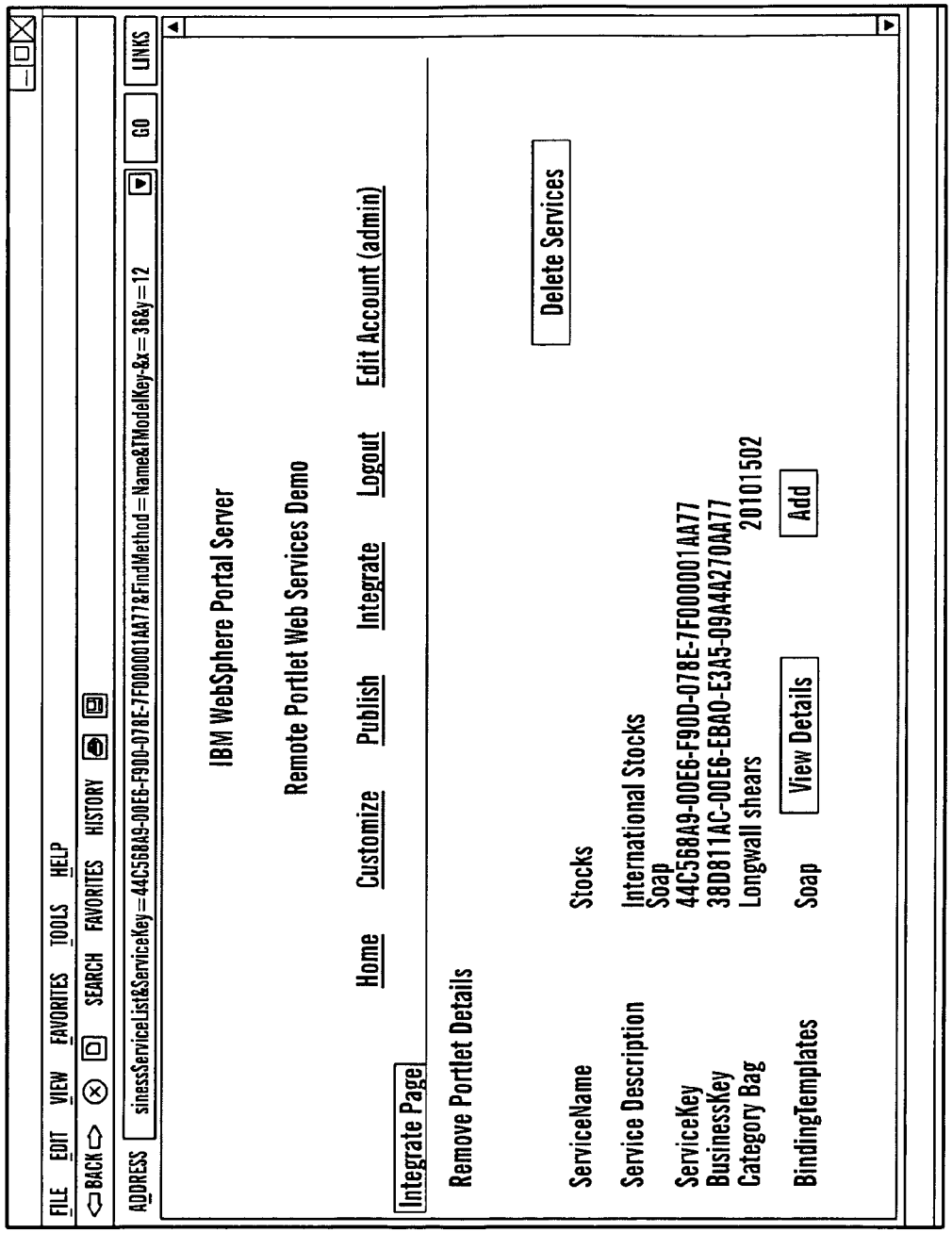
Figure 7I:
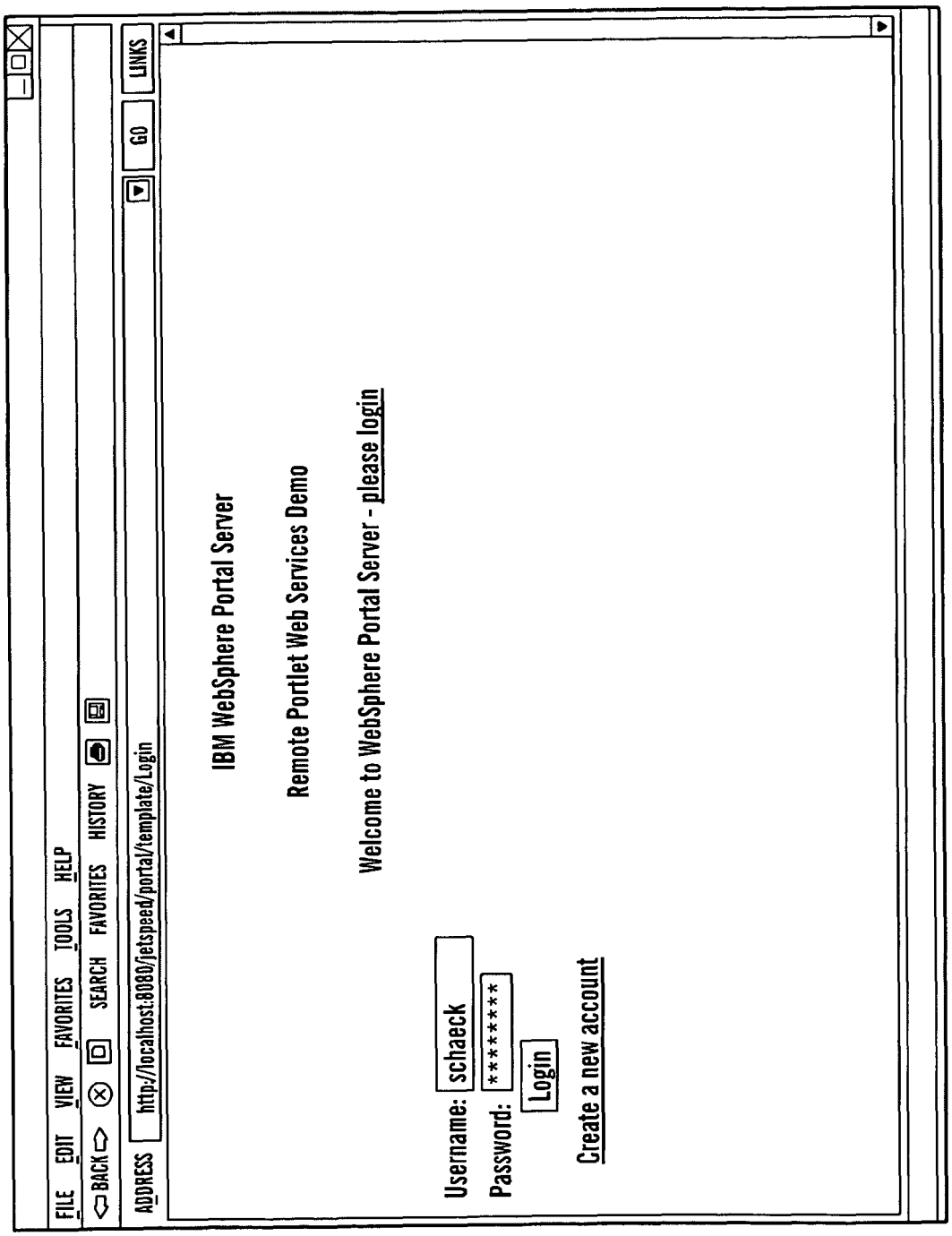
Figure 7J:
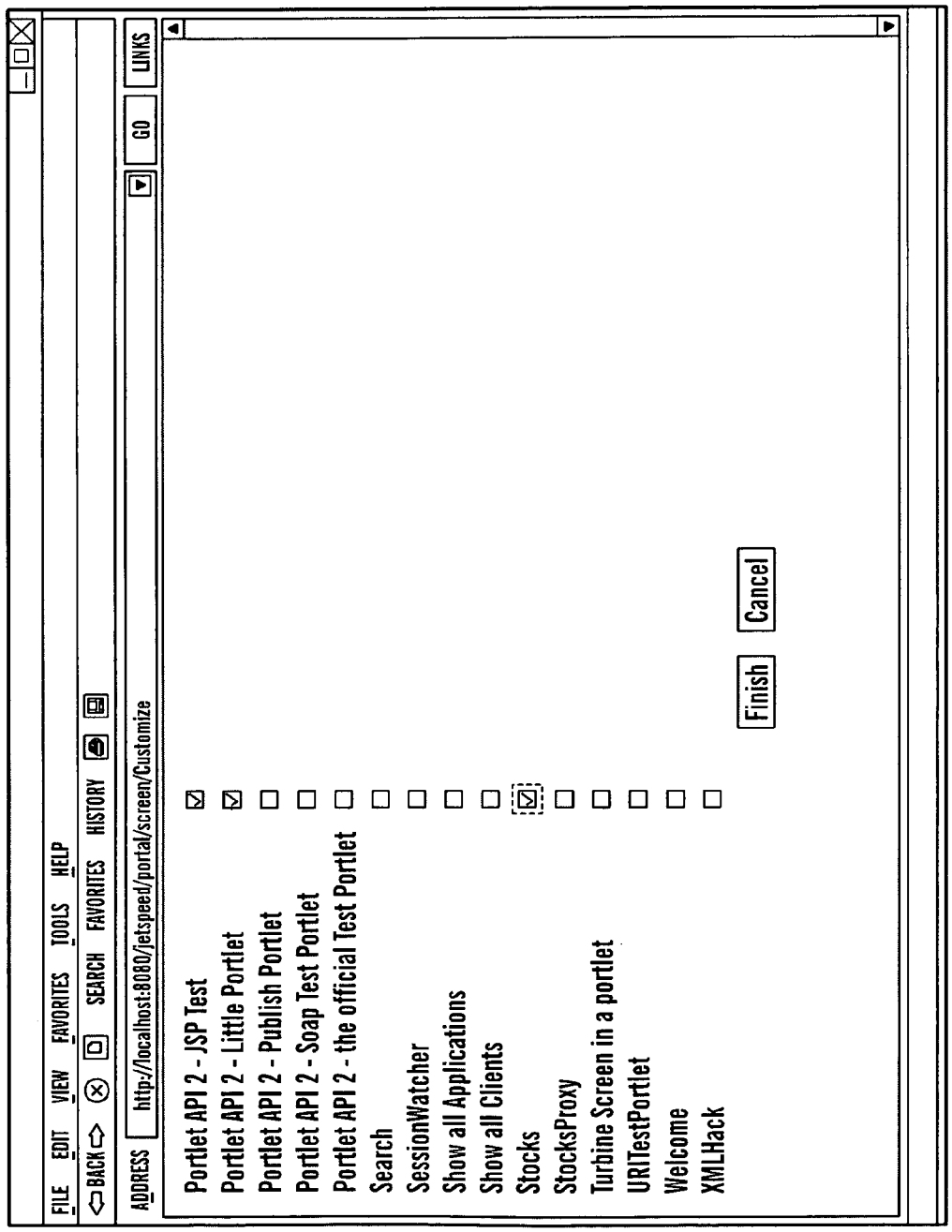
Figure 7K:
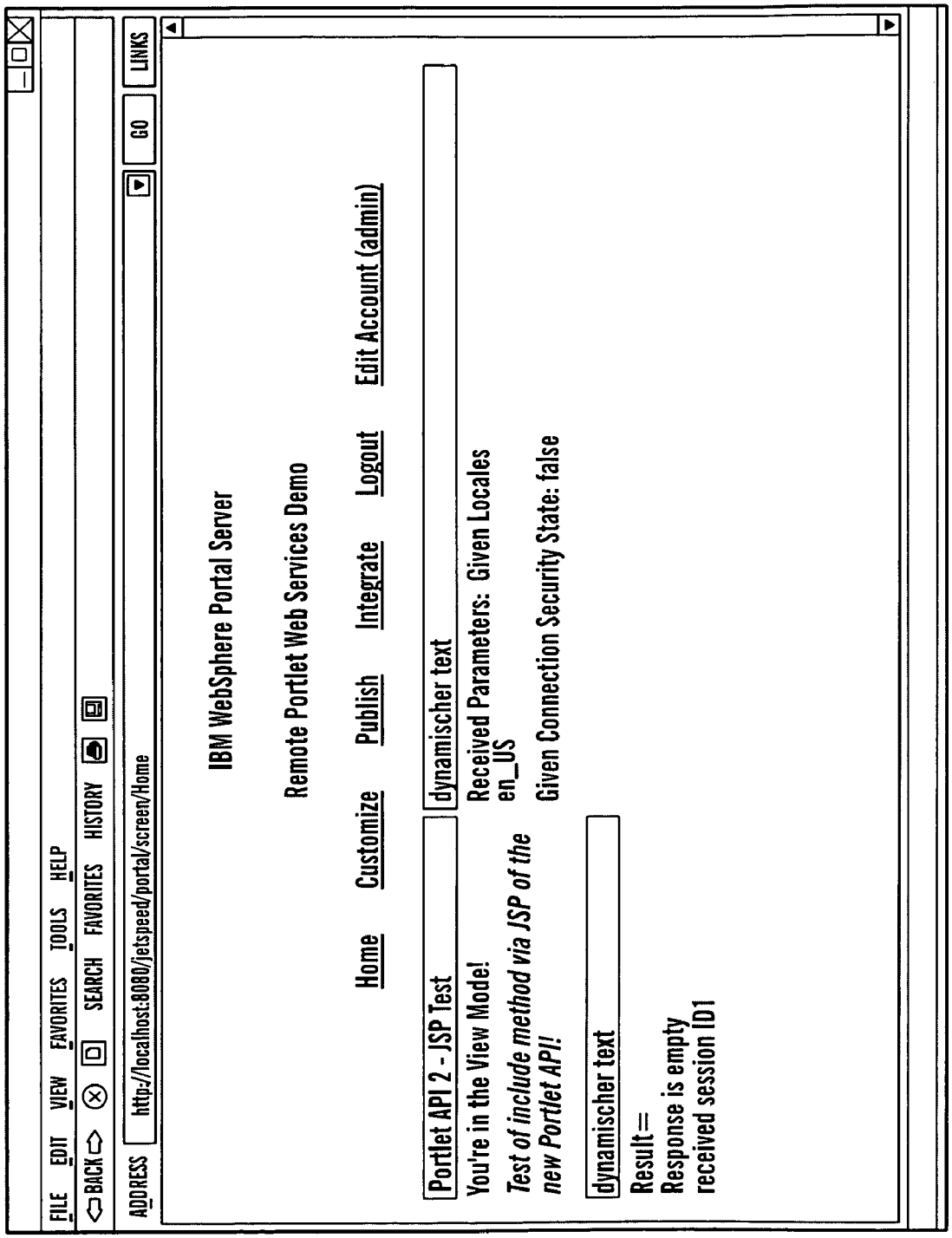

FIG. 5 shows a preferred embodiment of the present invention namely communicating Portals using the present invention FIG. 6 shows the basic functionality of the inventive Portal FIG. 7 A-K show user-guided interfaces of a preferred embodiment of the present invention for controlling Publishing and Finding/Binding of portlets as Web Services implemented in the IBM product WebSphere Portal Server (WSP).

Figure 8:
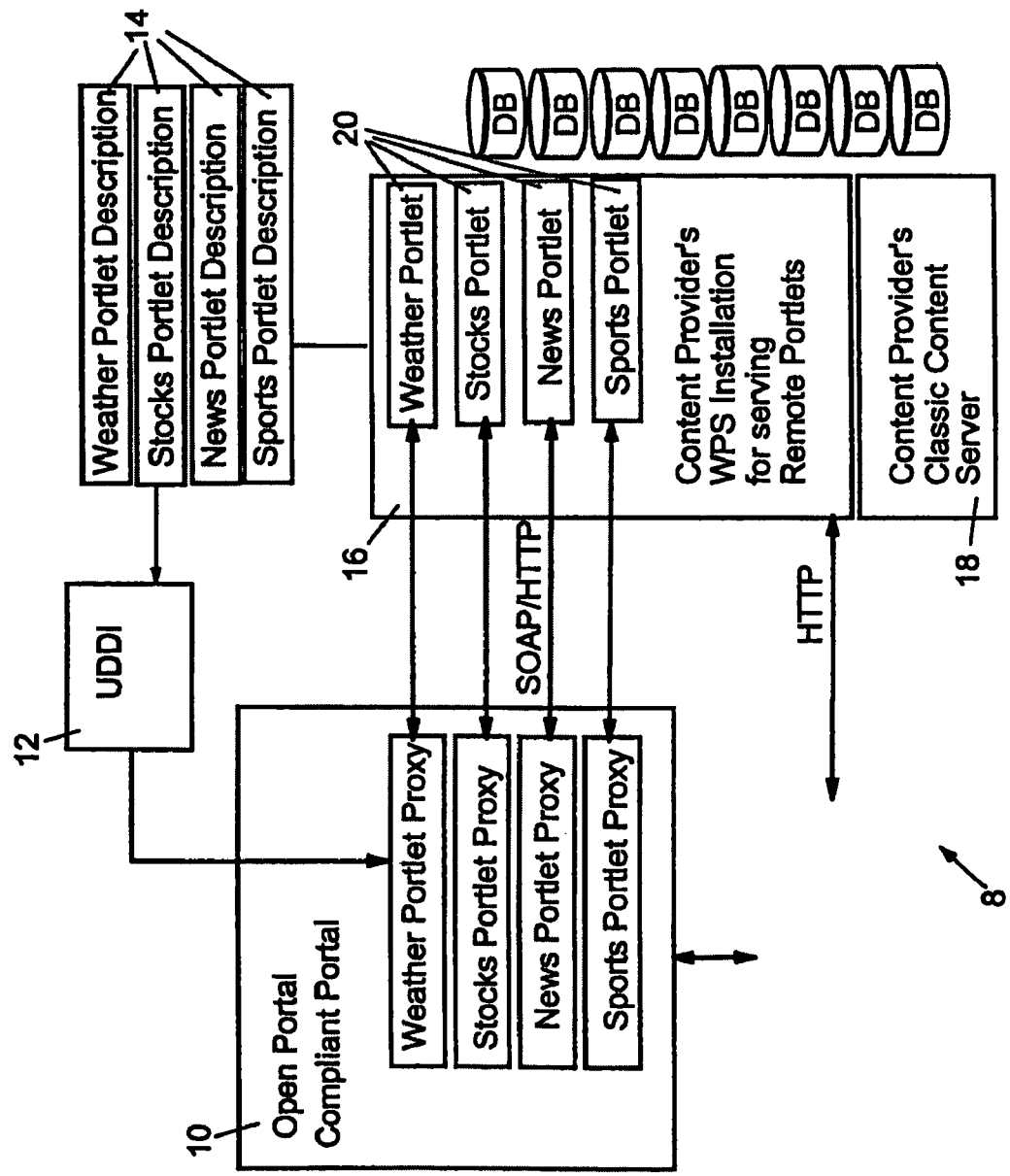

FIG. 8 shows an implementation of the present invention in a Content-Provider architecture.

DETAILED DESCRIPTION OF THE PRESENT INVENTION

FIG. 5 shows a preferred embodiment of the present invention.

This preferred embodiment of the present invention discloses sharing of local portlets of a Portal with other remote Portals. A remote server, e.g. another Portal-Server 5, publishes its local portlets as remote portlet Web-Services in a Central Directory, e.g. UDDI. UDDI, which stands for Universal Description, Discovery, and Integration, is a standard for registration and discovery of Web-Services. The Portal administration tool 14 of the Portal-Server 5 allows selection of a local portlet and publishing it into the Central-Registry 10. Portal-Server 5 posts the portlet information (service description of the portlet) containing at least portlet name, portlet description and portlet address in the Central-Directory 10 (publishing step). The communication between Portal 5 and Central-Registry 10 is based on the SOAP/HTTP protocol. The portal administration tool 12 of the other Portal-Server 1 allows the browsing in the Central-Registry 10 and finds and selects the portlet description (service description) of the previously published portlet. Portal 1 imports the portlet description from the Central-Registry 10 and creates a Remote Portlet Access information 20 in the local Portlet-Registry 16. Users of Portal 1 can now select and use the remote portlet Web-Service 7 to which the Remote Portlet Access Information 20 points like any local portlet. When a page is displayed that has the remote portlet 7 on it, the Portal-Aggregation Component 4 of Portal 1 creates and invokes a Portlet-Proxy 3 configured with the Remote Portlet Access Info 20 to call the remote portlet 7 on Portal 5. The Portlet-Proxy is a SOAP-client (not shown) which converts normal method calls initiated by the Portal-Aggregation component into SOAP-remote procedure calls of remote portlets. At the remote Portal-Server side there is SOAP-server (not shown) which converts SOAP-remote procedure calls into local method calls to the local portlet to be accessed.

A main advantage of this embodiment is that the remote portlets become available for the Portal without requiring local installation of the portlet code on the Portal itself.

FIG. 6 shows a work flow diagram describing how publishing, finding and binding of remote portlet Web-Services are implemented in the preferred embodiment. Each Portal application or administration tool being part of the Portal application must implement the following functionalities:

Publishing local portlets 6,8,10: that is an administration function 2 of the Portal application allowing publishing of local portlet information 6 into a Central-Registry, e.g. UDDI. The publishing function preferably requires a login of the administrator Finding and binding function 12,14,16: that is preferably an administration function of the portal application allowing the finding of remote portlet Web-Services in the Central-Registry and binding them. Alternatively, Portal applications may be set up in a way which allow Portal-users themselves to browse the Central-Directory for remote portlet Web-Services and select themselves and directly add references to remote portlets to their personal pages 4,18. When a page that references a remote portlet gets rendered, the Portal implementation uses a Portlet-Proxy to invoke the actual portlet Web-Service through the Remote Portlet Inovaction protocol.

Using remote portlets 4: that is a user functionality of the Portal application allowing the user to select remote portlet Web-Services. Once the remote portlet access information is in the Portlet-Registry (see FIG. 5), a user may select 18 it to be displayed on their personal pages.

FIG. 7 A-N show user-guided interfaces of a preferred embodiment of the present invention for controlling Publishing and Finding/Binding of portlets as Web-Services implemented in the IBM product WebSphere Portal-Server.

The publishing function of the administration tool being part of the Portal application is controlled by following graphical interfaces.

In FIG. 7 A the administrator logs in to WebSphere Portal-Server. After Login, the administrator can click on the Publish link. WebSphere Portal Server now displays a page that shows the list of available portlets. For each portlet, the portlet name and portlet description are displayed. In FIG. 7 B the administrator selects the portlet to be published. To publish a particular portlet to UDDI as a remote portlet Web-Service, the administrator presses the Publish button beside that portlet. WebSphere Portal-Server now prompts for a description for the portlet. In FIG. 7 C the administrator enters the remote portlet description and presses the Publish button. WebSphere Portal-Server now automatically creates a service description for the portlet to be published from the data entered by the administrator and the data stored in the WPS Portlet-Registry and publishes it to the Central-Registry defined in the WPS properties—either the public, global UDDI-registry or a corporate UDDI-registry. In FIG. 7 D WebSphere Portal-Server confirms successful publishing of a portlet as a remote portlet Web-Service.

The Finding and Binding function of the portal application is controlled by the following graphical interfaces:

Finding and Binding to remote portlet Web-Services will be possible for administrators as well as (optionally) for Portal users. WPS allows the disabling of this function for users if not desired. To find a remote portlet Web-Service, the administrator clicks on the Integrate link. WebSphere Portal-Server now prompts for a business name prefix to search for. Alternatively, it can search for all businesses that provide remote portlet web services using the appropriate TmodelKey for such Web-Services. In FIG. 7 E the administrator enters the business whose remote portlet Web-Services he wants to add to his portal (alternatively he might search for all businesses providing remote portlet Web-Services). When the administrator presses the Find button, WPS queries the UDDI-registry for businesses with the given name or providing services that have been published with the remote portlet web service TmodelKey and displays the result in a list. In FIG. 7 F is shown that WebSphere Portal-Server lists the businesses with the given name (alternatively it might list all businesses providing remote portlet web services). The administrator can view the details of the UDDI-business description or view the services offered by a business by pressing the View Service button. In the latter case, WPS queries the UDDI-registry for the services offered by the particular business. In FIG. 7 G is shown that the WebSphere Portal-Server displays the services provided by a business. Each entry in the list shows a service name and has a button to view the service details. When the administrator presses the View Details button, WPS displays a page with the service details. In FIG. 7 H is shown that the WebSphere Portal-Server displays service details for a particular remote portlet Web-Service with an Add-button that allows the addition of the remote portlet to the portals portlet registry. This page shows the service name, description, keys, category bags and binding templates. It has a ViewDetails button to view further details, an Add button and a Delete Service button. Deleting the service will only work from the Portal that published the remote portlet Web-Service. To add the remote portlet to the WPS Portlet-Registry in order to make it available to users, the administrator presses the Add button.

User functions for accessing remote portlets are controlled by following graphical interfaces:

In FIG. 7 I the user logs in to WebSphere Portal-Server. After Login, the user can click on the Customize link to navigate to the WPS Customizer screen that shows the available portlets. In FIG. 7 J the WebSphere Portal-Server displays the list of available local portlets and remote Portlet-Proxies for selection by the user. The user can select a Portlet-Proxy for a remote portlets like any local portlet. After selecting the remote portlet in the customizer, it is displayed on the user's page. In FIG. 7 K the WebSphere Portal-Server displays a page that contains a remote portlet.

FIG. 8 shows an implementation of the present invention in a Content-Provider architecture.

Today, most content providers publish their content live on the Internet using HTTP or FTP-Servers or they provide client software that replicates and caches content via proprietary protocols. In each case, integrating content into a Portal is a difficult task. While portals will provide some portlets supporting some content sources out of the box, it will be necessary to develop and install additional portlets for the remaining content sources, i.e. the party that sets up the portal needs to spend a lot of money and effort in order to aggregate a rich set of content from different sources. This is not only a bad situation for portal owners but also for Content-Providers as the fact that it is hard to include content limits business growth of content providers to depend on services capacities.

In order to allow for integration of their content in Portals without any programming or service effort, Content-Providers can use WPS to surface their content as portlets and publish these portlets as remote portlet Web-Services in the public, global UDDI directory. In order to provide this value add to customers, the Content-Provider 8 runs a WebSphere Portal-Server installation 16 using the present invention in addition to the classical Content-Server 18. Once the Content-Provider 8 has used the publish function provided by WPS 16 to advertise the content portlet Web-Services 20 in UDDI 12, administrators of OpenPortal compliant portals 10 who whish to use content portlets from the content provider 8 can simply look up the Content-Provider's business entry in the UDDI-registry 12 and bind to the desired remote content portlet Web-Services 14. The portlets 20 on the Content-Provider's server become available immediately without any programming or installation effort and can be used by the Portal users. At the same time, WPS 16 provides the Content-Provider 8 itself with a Portal, i.e. the Content-Provider can also make content available to users directly if desired.

Another embodiment of the present invention may be the use of application portlets offered by Application-Provider-Server. The term application portlet used mainly covers more complex portlets containing user interaction functions, e.g. e-mail portlets, calendar portlets, to do-list portlets, address book portlets.

What is claimed is:

1. A portal server comprising:
   at least one local portlet;
   at least one interface component for establishing communication with users;
   a content component;
   a SOAP/HTTP communication protocol component for establishing communication between the content component and the portal server;
   a publishing component for automatically creating a service description of said at least one local portlet and publishing said service description into a Universal Description, Discovery, and Integration (UDDI); a finding and binding component for selecting service descriptions of at least one remote portlet previously published in said UDDI and electronically binding said at least one remote portlet using said service description published in said UDDI to establish access to said at least one remote portlet, wherein said access is without local installation of portlet code of the at least one remote portlet onto the portal server;

a portlet registry implemented on a storage device for storing remote portlet access information derived from said service descriptions; and a portlet proxy having an interface with said portlet registry for receiving portlet access information and an interface with a second portal server offering a remote portlet web service.

2. A portal server according to claim 1, further comprising:

a portal aggregation component having an interface to said portlet registry and said portlet proxy.

3. A portal server according to claim 2, with said portlet registry having an interface to said finding and binding component.

4. A portal server according to said claim 1, wherein said service description contains at least portlet name, portlet description, and portlet address.

5. A portal server according to claim 1, with said user interface component having an interface to said portlet registry for user selection of remote portlets.

6. A portal server according to claim 1, further including a direct interface between said user interface component and said finding and binding component to enable a user to initiate a finding and binding procedure by use of said finding and binding component.

7. A portal server according to claim 6, further including an interface between said user interface component and said portal aggregation component.

8. A content provider system comprising:

at least one locally accessible content portlet;

at least an interface component for establishing communication via a network with a portal server;

a publishing component for creating service descriptions of said locally accessible content portlets, storing the service descriptions in a portlet registry implemented on a storage device, and publishing said service descriptions into a UDDI; and a SOAP/HTTP communication protocol component for establishing communication between said content provider and said portal server for execution of said local content portlet at said content provider via said portal server by means of finding and binding of said service description of said content portlet in said UDDI by said portal server and establishing communication and execution of said content portlet using access information of said service description for accessing said content portlet, wherein said communication is without local installation of portlet code of the at least one remote portlet onto the portal server.

9. A portal server comprising:

an interface component for establishing communication via network with a content provider;

a finding and binding component for selecting service descriptions of content portlets in a central registry and binding said content portlets by using said service descriptions for accessing said remote portlets, wherein said service descriptions of said content portlets are created and stored on a portlet registry implemented on a storage device and published into a UDDI by said content provider; and a SOAP/HTTP communication protocol component for establishing communication between said portal server and said content provider for execution of said content portlet installed at said content provider, wherein said communication is without local installation of portlet code of the remote portlet onto the portal server.

* * * * *